United States Patent [19]
Iino et al.

[11] Patent Number: 5,565,091
[45] Date of Patent: Oct. 15, 1996

[54] CATALYST COMPOSITION MANUFACTURING METHOD AND SULFUR-CONTAINING HYDROCARBON HYDRODESULFURIZATION METHOD USING THE SAME CATALYST COMPOSITION

[75] Inventors: Akira Iino; Ryuichiro Iwamoto; Tsuyoshi Mitani, all of Sodegaura, Japan

[73] Assignees: Idemitsu Kosan Co., Ltd.; Petroleum Energy Center (PEC), both of Tokyo, Japan

[21] Appl. No.: 318,821
[22] PCT Filed: Feb. 15, 1994
[86] PCT No.: PCT/JP94/00222
 § 371 Date: Oct. 14, 1994
 § 102(e) Date: Oct. 14, 1994
[87] PCT Pub. No.: WO94/17910
 PCT Pub. Date: Aug. 18, 1994

[30] Foreign Application Priority Data

Feb. 15, 1993 [JP] Japan ..................... 5-047190

[51] Int. Cl.$^6$ .............. C10G 45/04; B01J 21/04; B01J 23/76
[52] U.S. Cl. ............ 208/216 R; 208/217; 502/313; 502/314; 502/315; 502/355; 502/415; 423/628; 423/629
[58] Field of Search .............. 502/8, 313, 314, 502/315, 355, 415; 423/628, 629; 208/216 R, 217

[56] References Cited

U.S. PATENT DOCUMENTS

| | | | |
|---|---|---|---|
| 2,898,308 | 8/1959 | Teter et al. | 502/314 |
| 2,938,002 | 5/1960 | Keith et al. | 502/314 |
| 3,042,628 | 7/1962 | Cramer et al. | 423/628 |
| 3,267,025 | 8/1966 | Gring et al. | 208/216 R |
| 3,472,791 | 10/1969 | Vesely | 502/8 |
| 3,872,030 | 3/1975 | Feins et al. | 502/314 |
| 3,928,180 | 12/1975 | Hilfman | 502/314 |
| 4,530,911 | 7/1985 | Ryan et al. | 502/210 |
| 5,001,101 | 3/1991 | Kemp | 502/211 |
| 5,200,381 | 4/1993 | Kamo | 502/314 |
| 5,232,888 | 8/1993 | Kamo | 502/314 |

FOREIGN PATENT DOCUMENTS

| | | |
|---|---|---|
| 2424062 | 11/1979 | France . |
| 2647702 | 4/1977 | Germany . |

*Primary Examiner*—Anthony McFarlane
*Assistant Examiner*—Walter D. Griffin
*Attorney, Agent, or Firm*—Antonelli, Terry, Stout & Kraus

[57] ABSTRACT

By mixing an alumina gel suspension prepared by dispersing alumina gel in pure water in an alumina concentration of 0.1 to 12% by weight, with an aqueous metal salt solution wherein a compound of a Group VIA metal and a compound of a Group VIII metal are dissolved, and then evaporating water to dry while stirring the mixture, the metal component can be loaded effectively on the alumina gel to a sufficiently high loading quantity, and active catalyst compositions useful as catalysts being superior in functions, such as activities, to the conventional hydrogenation catalysts are easily obtainable. Sufficiently desulfurized hydrocarbons are obtainable by allowing the catalyst compositions to contact sulfur-containing hydrocarbons in the presence of hydrogen.

19 Claims, No Drawings

CATALYST COMPOSITION MANUFACTURING METHOD AND SULFUR-CONTAINING HYDROCARBON HYDRODESULFURIZATION METHOD USING THE SAME CATALYST COMPOSITION

TECHNICAL FIELD

The present invention relates to a method of preparing a catalyst composition and to a process for hydrodesulfurizing sulfur-containing hydrocarbons by using the catalyst composition as a desulfurization catalyst. Particularly, the present invention relates to a method of preparing a highly active catalyst composition, which may be advantageously used for the hydro-refining (for example, hydrodesulfurization, hydrodenitrogenation and hydrogenation), particularly hydrodesulfurization, of various hydrocarbons, for example, petroleum hydrocarbons, such as naphtha fractions, kerosene fractions, gas oil fractions, atmospheric residues, vacuum gas oils, vacuum residues and light cycle oils, shale oils and coal-derived oils. The present invention further relates to a hydrodesulfurization process, wherein the catalyst composition is used as a hydrodesulfurization catalyst, so that various sulfur-containing hydrocarbons, such as the above-described hydrocarbons containing organic sulfur compounds, can be desulfurized efficiently to give hydrocarbons of high quality which contain sufficiently reduced amounts of sulfur and nitrogen and are useful as fuel oils or the feed oils in the following catalytic processes.

BACKGROUND ART

Recently worldwide environmental disruption has become a serious problem. In particular, combustion of fossil fuels, such as petroleums and coals, is accompanied by the generation of nitrogen oxides ($NO_x$) and sulfur oxides ($SO_x$), which when released into atmosphere, make acidic rain or acidic fog, to damage severely the natural environment of forests, lakes and mashes. Also, $SO_x$ and $NO_x$, and further the particulates (such as the particulates of soot, dust and mist) released with the combustion exhaust are harmful to human bodies inhaling them. These circumstances demand some measure for as much reduction of the release of these pollutants including $SO_x$, $NO_x$ and the particulates as possible.

A common measure for reducing the $SO_x$ release is an after-treatment following the combustion, i.e. flue gas desulfurization, which however is impractical for moving exhaust sources even if operable technically. It is therefore desirable to reduce the sulfur content; in fuels to a degree which no longer requires the flue gas desulfurization.

On the other hand. $NO_x$ occur necessarily even from well denitrified fuels when air is used for combustion, and particulates also occur in a large quantity depending on the kinds of fuels and the manners of combustion, thereby necessitating exhaust gas treatments for inhibiting release of $NO_x$ and particulates into atmosphere.

In the cases of stationary exhaust sources, such as boilers, it has become possible to remove fairly well the atmospheric pollutants, such as $SO_x$, $NO_x$ and the particulates, by flue gas desulfurization or $NO_x$ removal. In the case of gasoline engines, such as those of passenger cars, the simultaneous removal of $NO_x$, CO and hydrocarbons from exhaust gas has been effected by a ternary catalyst system, with the $SO_x$ content in the exhaust gas maintained low by using gasoline with low sulfur content. On the other hand, in the cases of diesel engines of trucks or the like, which are moving exhaust sources of these pollutants, the exhaust contains large quantities of $NO_x$ and the particulates including soot, which are now released as they are into atmosphere because of the absence of completed purification techniques. In such circumstances, there arises quickly the development of techniques for removing particulates also from diesel exhaust by oxidation or trapping and for removing $NO_x$ by reduction with catalysts operable in the atmosphere of oxygen. However, diesel engines use gas oils or the like as fuels and release exhaust gas containing a considerable concentration of $SO_x$ due to the present insufficient reduction of the sulfur content in the fuels. The $SO_x$ not only cause atmospheric pollution but also hinder considerably the removal of $NO_x$ from the exhaust. In order to remove $NO_x$ from the exhaust of diesel engines, it is necessary to treat the exhaust in after-treatment apparatuses with $NO_x$-removal catalysts. During such after-treatments, if the reduction of the concentration of the coexisting $SO_x$ is insufficient, the remaining $SO_x$ considerably accelerate the poisoning of the catalysts, and make it difficult to stably maintain sufficient catalytic functions for a long term. That is, a sufficient reduction of the sulfur content in diesel fuels, such as gas oils, is necessary also from the viewpoint of the maintenance of the catalytic functions.

Thus there is an urgent demand for more effective techniques for reducing the sulfur content in various hydrocarbon fuels, particularly in diesel fuels, such as gas oils.

Such a demand is not limited in fuel fields. The sulfur (or organic nitrogen compounds in some cases) contained in hydrocarbons generally deteriorates the catalytic functions in many catalytic processes, such as catalytic cracking or catalytic reforming processes. This also causes a strong demand for improved techniques for the effective removal of the sulfur compounds or organic nitrogen compounds from material hydrocarbons, particularly for the development of more efficient hydrodesulfurization catalysts.

There have been provided many techniques for the hydrodesulfurization of sulfur-containing hydrocarbons. In these conventional techniques were proposed various catalysts having the activity of hydrodesulfurizing gas oil fractions or the like, among which that are typical and widely used are those resulting from various modifications of alumina-base catalysts loaded with Group VIA metals and Group VIII metals of the Periodic Table. However, the above-described circumstances have demanded further improvement in the catalytic functions of these conventional hydrodesulfurization catalysts.

The functions of such metal-loaded catalysts are known to depend considerably on the state of loading of the metal component, and the development of the preparation techniques, particularly the technique for loading the metal component, seems to be very important. As to the above-described hydrodesulfurization catalysts, there have already been proposed various preparation techniques, and typical one is so-called impregnation technique, wherein an alumina support prepared by calcining alumina gel is loaded with salts of metals, such as Group VIA metals and Group VIII metals, by impregnation. However, in the conventional impregnation technique, namely the loading technique by impregnating calcined alumina support with aqueous metal salt solutions, when it is attempted to increase the loading rate of the active metal component (effectively loaded component consisting of Group VIA metals; and Group VIII metals) to improve the desulfurization activity, there arises difficulty in loading, or, even if the loading rate could be increased, the supported active metal component aggregates easily to lower their dispersion, thereby making the improvement in activity insufficient or, in some cases, rather reducing the catalytic functions, including activities.

It has been proposed to improve the impregnation techniques by adding additives, such as oxy acids (hydroxycarboxylic acids) or EDTA, to the impregnation liquid [Japanese Patent Application Kokoku Koho (publication) No. 4-15-33940, Japanese Patent Application Kokoku Koho (publication) No. 55-33940, Japanese Patent Application Kokai Koho (Laid-open) No. 60-187337, etc.]. These techniques are advantageous in that the additives improve the stability of the aqueous metal salt solutions, so that the aggregation of the loaded metal component can be prevented remarkably by, though troublesome, selecting the optimum impregnation conditions, as compared with the conventional impregnation, technique. However, due to the fundamental impregnation technique as described above, even these improved techniques involve the problem that increasing the metal component also causes easy aggregation of the loaded metal component, failing in giving highly active catalysts.

Another known technique is so-called kneading technique, wherein catalysts are prepared by kneading alumina gel (hydrogel) per se with metal salts (aqueous solution), followed by calcination [Japanese Patent Application Kokai Koho (Laid-open) No. 1-164440, Japanese Patent Application Kokoku Koho (Publication) No. 53-6113]. According to the kneading technique, generally, the loading rate of the metal component can be increased easily as compared with the above-described impregnation techniques. However, in such a conventional kneading technique, a highly concentrated alumina gel is allowed to contact metal salts, so that the contact occurs only partially (locally) not to effect microscopically effective mixing. This results in uneven loading, and particularly the metal component is apt to be maldistributed or to remain separated from the alumina support and, at the time of calcination or pretreatments, changes to inconvenient form (for example, metal particles of low distribution or isolated metal particles), which affect adversely the catalytic functions, for example, decreases hydrodesulfurization activities or causes excessive hydrocracking. There is a report that the catalysts prepared by such a conventional kneading technique are generally inferior in hydrodesulfurization activities to the catalysts prepared by the above-described impregnation techniques [refer to Kogyo Kagaku Zasshi, 74, No. 3, page 10 (1971)].

Also proposed is a combination of kneading and impregnation [Japanese Patent Application Kokai Koho (Laid-open) Nos. 61-138537 and 51-24593]. This technique needs very complicated operation, which causes problems, such as the high production cost.

DISCLOSURE OF INVENTION

An object of the present invention is to develop, as a method of preparing a catalyst composition comprising Group VIA metals, Group VIII metals and alumina, a novel loading technique which permits effective loading of enough metal component, thereby providing a practically useful method of preparing catalyst compositions which enables easy production of highly active catalysts being superior in functions, such as activities, to the conventional hydrogenation catalysts, such as the hydrodesulfurization catalysts prepared by the conventional loading techniques, particularly the above-described impregnation or kneading techniques.

Another object of the present invention is to provide, as a method for obtaining from various; sulfur-containing hydrocarbons, for example, hydrocarbon fractions containing at least organic sulfur molecules, such as gas oil fractions or kerosene fractions, hydrocarbons at least the sulfur content of which is sufficiently reduced, a practically very useful process for hydrodosulfurizing sulfur-containing hydrocarbons wherein the catalyst composition of the present invention is used and gives full advantage.

The inventors made researches to improve the catalytic functions of the catalysts comprising Group VIA metals and Group VIII metals of the Periodic Table and alumina, particularly the hydrodesulfurizing activities on sulfur-containing hydrocarbons, such as gas oil fractions, and made various investigations mainly to find effective methods for loading these active metals on alumina. It was consequently found that by using a novel loading technique comprising mixing an alumina gel dispersion of a specific concentration of alumina with an aqueous metal salt solution and then evaporating the solvent to dry with stirring, the active metal component could be loaded in a highly dispersed state to an extremely high loading rate, to give easily a catalyst composition being useful as an active catalyst with high hydrogenation activities.

They also found that by using an aqueous solution prepared by adding to the aqueous metal salt solution various specific components as the stabilizers of the dissolved metal salts, the active metal component could be loaded in a more highly dispersed state to an extremely high loading rate, to give a catalyst composition with higher activities and higher functions.

It was also confirmed that the catalyst compositions prepared by these novel techniques, particularly those with high loading rate of metals, were very effective for the hydrogenation of various hydrocarbons and are particularly useful as highly active catalysts exhibiting extremely high activities in the hydrodesulfurization of various sulfur-containing hydrocarbons, such as gas oil fraction, kerosene fractions and heavy oil fractions.

That is, the present invention provides a method of preparing a catalyst composition comprising mixing an alumina gel suspension which is prepared by dispersing alumina gel in pure water in an alumina concentration of 0.1 to 12% by weight, with an aqueous metal salt solution wherein a compound of a Group VIA metal of the Periodic Table and a compound of a Group VIII metal of the Periodic Table are dissolved, and then evaporating the water to dry while the mixture was stirred, to load the metal compounds on the alumina gel.

As a particularly useful and effective application among various reaction processes wherein the catalyst composition prepared by the method of the present invention is usable as a catalyst, the present invention further provides a process of hydrodesulfurizing a sulfur-containing hydrocarbon, comprising allowing the sulfur-containing hydrocarbon, in the presence of hydrogen, to contact the catalyst composition.

BEST MODE FOR CARRYING OUT THE INVENTION

According to the method of the present invention, the objective catalyst composition is prepared by loading alumina with the above-described active metal component by using the above-described specific loading technique. Prior to the detailed description of the preparation method, the catalyst composition prepared by the method will be described below.

The catalyst composition prepared by the method of the present invention comprises, at least, one or more Group VIA metals, one or more Group VIII metals and alumina. That is, the catalyst composition comprises, at least, an active metal component consisting of these metal elements and a support consisting of or consisting essentially of alumina.

The Group VIA metals include chromium, molybdenum and tungsten. The metals to be used may be selected from these metals depending particularly on the kind of the reaction in which the catalyst composition is to be used, or on the kind of the other metals to be contained in the catalyst composition, and one or more may be selected. For example, in the case in which the catalyst composition is to be used for hydrogenation, such as the hydrodesulfurization described later, it is generally (preferable to use molybdenum and/or tungsten.

The Group VIII metals include iron, cobalt, nickel, ruthenium, rhodium, palladium, osmium, iridium and platinum. The metals to be used may be selected from these metals depending particularly on the kind of the reaction in which the catalyst composition is to be used, or on the kind of the other metals to be contained in the catalyst composition, and one or more may be selected. For example, in the case in which the catalyst composition is to be used for hydrogenation, such as the hydrodesulfurization described later, it is generally preferable to use cobalt and/or nickel.

The combination of the Group VIA metals and the Group VIII metals may also be selected in the same manner as described above. For example, in the case in which the catalyst composition is to be used for the hydrodesulfurization described later, it is generally preferable to combine one or two of cobalt and nickel with one or two of molybdenum and tungsten, and the preferred examples include various combinations, such as the combination of cobalt and molybdenum, nickel and molybdenum, nickel and tungsten, and cobalt, nickel and molybdenum, and the particularly preferred examples are the combination of cobalt and molybdenum and the combination of nickel and molybdenum.

It should be noted that the Group VIA metals and Group VIII metals are not always loaded in the metallic state. For example, if the catalyst composition was calcined by a conventional method, the loaded metals will be, partially or wholly, loaded in the state of oxides or compound oxides, and taking concrete examples, cobalt, nickel, molybdenum and tungsten will be supposed, formally, to be in the states of $CoO$, $NiO$, $MoO_3$ and $WO_3$, and considering the combinations thereof, will also be supposed to be in the states of compound oxides, such as $CoO.MoO_3$ and $NiO.WO_3$. After a reduction treatment, it is also general that these oxides are converted partially (mostly, for some metals) into metals or into oxides or compound oxides of low oxidation states, and after presulfiding or during desulfurization, a part of these metals are supposed to be converted into sulfides. That is, in the catalyst composition, these metals may be in the states of various compounds depending on the conditions of pretreatments and use.

As described above, the catalyst compositions containing molybdenum and/or tungsten as the Group VIA metals and cobalt and/or nickel as the Group VIII metals are suitable for hydrodesulfurization, and the particularly preferred are those wherein, when the Group VIA metals (molybdenum and tungsten) and the Group VIII metals (cobalt and nickel) are calculated as generally stable oxides ($MoO_3$, $WO_3$, $CoO$ and $NiO$) and the alumina component is calculated as $Al_2O_3$, the total of the molybdenum component and the tungsten component as the above-described oxides is generally 10 to 60% by weight, preferably 12 to 50% by weight, and the total of the cobalt component and the nickel component as the above-described oxides is generally 2 to 30% by weight, preferably 3 to 15% by weight, both based on the total of the metal oxides and $Al_2O_3$. In the cases of the catalyst compositions containing molybdenum as the Group VIA metal and cobalt as the Group VIII metals, among those described above that are preferred have a ratio of the cobalt component to the molybdenum component ranging from 0.10 to 0.50, preferably from 0.15 to 0.45 in weight ratio ($CoO/MoO_3$).

The total of the metals as the respective stable oxides of the metals in the catalyst composition of the present invention is generally 20 to 70% by weight, preferably 22 to 50% by weight. If it exceeds 70% by weight, metals may aggregate to deteriorate the loading state, and if it is less than 20% by weight, the activities may be decreased.

Herein, the stable oxides of the Group VIA metals, namely chromium, molybdenum and tungsten, and the Group VIII metals, namely iron, cobalt, nickel, ruthenium, rhodium, palladium, osmium iridium and platinum, mean $Cr_2O_3$, $MoO_3$, $WO_3$, $Fe_2O_3$, $CoO$, $NiO$, $RuO_2$, $Rh_2O_3$, $PdO$, $OsO_2$, $IrO_2$ and $PtO$, respectively.

These catalyst compositions preferably have an appropriate specific surface area, generally 100 to 400 $m^3/g$, particularly 120 to 380 $m^3/g$. The reason is that a too small specific surface area makes it impossible to load the metal component effectively to a sufficiently high loading rate, and gives little area effective for reactions, requiring an increased quantity of the catalyst compositions. On the other hand, those having a too large specific surface area generally contain so many small pores as to affect adversely the diffusion of feed oils to active sites and decrease the effectiveness factor, thereby hindering the effective use of the catalyst.

Catalyst compositions having a composition and specific surface area selected from the above-described ranges exhibit particularly high activities and excellent functions in the hydrodesulfurization of sulfur-containing hydrocarbons described later.

The catalyst composition prepared by the method of the present invention may contain other components, such as metal components other than the above-described ones or support components other than alumina, according to demands. It is also possible to modify the physical properties or quality or to mold into various shapes, depending on the purposes of use. Of course, before use for a reaction, pretreatments may be carried out to modify the catalyst composition to the optimum state for the reaction.

In the method of the present invention, the catalyst compositions having the above-described various compositions and properties are prepared by using the above-described specific loading technique.

That is, in the method of the present invention, alumina gel is used as an alumina material which becomes support or a support component, and is dispersed in pure water to give an alumina gel suspension. It is important that when the aluminum component is calculated as alumina ($Al_2O_3$), its concentration in the alumina gel suspension is within the range of 0.1 to 12% by weight.

The alumina gel may be prepared by a conventional method, for example, it may be prepared easily by mixing or titrating an aqueous solution of an alkali aluminate, such as sodium aluminate of potassium aluminate with an aqueous solution of an aluminum salt, such as aluminum sulfate or aluminum nitrate, or dropping seed acid or sulfuric acid, into an aqueous solution of an alkali aluminate, such as sodium aluminate or potassium aluminate, or dropping an alkali, such as an aqueous solution of sodium hydroxide, potassium hydroxide, sodium carbonate, potassium carbonate or ammonia, into an aqueous solution of aluminum salt, such as aluminum sulfate, aluminum nitrate or aluminum chloride, to generate precipitate, which is then separated from the liquid and is washed sufficiently for example with water to remove impurities, namely the salts of alkalis or acids. It may also be prepared by gelifying commercial alumina sol, for example, by concentration with heat. After the formation of precipitate (alumina gel), the gel may be aged, according to demands. The properties of the alumina gel (for example, particle size) can be controlled by the aging, thereby enabling the adjustment of the specific surface area of the catalyst composition or the improvement in the state of the loaded metal component. In both cases, it is preferable not to allow the obtained precipitate (alumina gel) to stand for a long period but to filter, wash and use it for the preparation of the alumina gel suspension as soon as possible.

During the preparation of the alumina gel or in some following step, other components also may be added. For example, to increase the strength of the catalyst body or to control the specific surface area or acidity, various compounds which are suitable as additives, such as a silica component, a phosphorus component or a boria component, may optionally be added.

Although the preferred examples of the pure water wherein the alumina gel is to be dispersed are ion exchanged water or distilled water, city water or industrial water may also be used, and additives, such as agents for adjusting pH, may be added, according to demands, unless inhibiting the achievement of the object of the present invention. It is important that the alumina gel suspension, at the time of mixing with the aqueous metal salt solution, is adjusted to the specific alumina concentration (a concentration converted to an alumina basis), namely within the range of 0.1 to 12% by weight. If the alumina concentration in the alumina gel suspension is less than 0.1% by weight, the evaporation of the solvent to dry will take a long time to lower the functions, and if higher than 12% by weight, there will occur local contact between the metal component and the alumina gel, which makes the loading state uneven, and also the metal component or alumina will be apt to change the properties due to the local deposition of the metal component, and in both cases, sufficient achievement of the object of the present invention will become impossible. The preferred alumina concentration is 5 to 10% by weight.

The technique for dispersing and suspending the alumina gel in the pure water may be selected from various ones, such as the conventional one using agitators, and, for example, it is particularly desirable to use a high-power dispersing machine, such as a homogenizer, to increase the dispersibility.

With respect to the aqueous metal salt solution, which is to be mixed with the alumina gel suspension and is an aqueous solution wherein at least a compound of Group VIA metal and a compound of Group VIII metal are dissolved, the kinds of these metals may be selected depending on the desired composition of the objective catalyst composition, namely the use of the catalyst composition (the catalytic process wherein the catalyst composition is to be used).

Particularly, to prepare a catalyst composition suitable for so-called hydrogenations, such as hydrodesulfurization or hydrodenitrogenation, it is preferable, as described previously, to select molybdenum and/or tungsten as the Group VIA metal and cobalt and/or nickel as the Group VIII metal and to use compounds of these metals for the preparation of the aqueous solution. In the aqueous metal salt solution, according to demands, components other than these metal compounds may optionally be added for some purpose, for example, for improving the catalytic functions.

The compounds of molybdenum and/or tungsten to be used for the preparation of the aqueous metal salt solution may be various ones, including not only ones being water-soluble per se but also ones which become water-soluble by the addition of appropriate additives, and it is generally suitable to use ammonium molybdate, ammonium paramolybdate, ammonium metamolybdate, ammonium tungstate, ammonium paratungstate, ammonium metatungstate, molybdic acid, paramolybdic acid, metamolybdic acid, tungstic acid, paratungstic acid, metatungstic acid, $MoO_3$ or $WO_3$. $MoO_3$ and $WO_3$, in spite of the poor water-solubility thereof, can be made into usable aqueous solutions of enough stability by improving the water-solubility with suitable stabilizers as described later. According to demands, two or more of these compounds may be used.

The compounds of cobalt and/or nickel to be used may also be various ones, and it is generally suitable to use cobalt nitrates, such as $Co(NO_3)_2$, cobalt acetate, basic cobalt carbonate; nickel nitrate, nickel acetate or basic nickel carbonate. According to demands, two or more of these compounds may be used.

The concentrations of these metal compounds and the ratio of the metal component in the aqueous metal salt solution may be selected depending, for example, on the composition of the objective catalyst composition. It is' generally desirable that the total of the compounds of the Group VIA metals and the compounds of the Group VIII metals are 20 to 70% by weight, preferably 22 to 50% by weight, based on the total of the compounds of the Group VIA metals, the compounds of the Group VIII metals and the alumina gel, with the proviso that the compounds of the Group VIA metals and the compounds of the Group VIII metals are calculated as stable oxides of the metals and the alumina gel is calculated as $Al_2O_3$. If the total of the compounds of Group VIA metals and the compounds of Group VIII metals calculated as above is more than 70% by weight, the metals may aggregate to deteriorate the state of loading, and if less than 20% by weight, the catalyst composition may have poor activities.

For example, to obtain a catalyst composition suitable for hydrodesulfurization, it is desirable to use compounds of molybdenum and/or tungsten as the compounds of Group VIA metals and compounds of cobalt and/or nickel as the compounds of Group VIII metals, in such ratios that the total of the compounds of molybdenum and/or tungsten is 10 to 60% by weight, preferably 12 to 50% by weight and the total of the compounds of cobalt and/or nickel is 2 to 30% by weight, preferably 3 to 15% by weight, both based on the total of the compounds of molybdenum and/or tungsten, the compounds of cobalt and/or nickel and alumina gel; provided that the quantities of the compounds of molybdenum, tungsten, cobalt and nickel are calculated as $MoO_3$, $WO_3$, CoO and NiO, respectively, and the quantity of alumina gel as $Al_2O_3$.

The concentration of the metal compounds in the aqueous metal salt solution is not particularly limited so far as the compounds are dissolved well at the time of mixing or loading, and it is generally preferable to use for the mixing an aqueous metal salt solution which has a concentration of the metal compounds as the molar concentration of the total of the metals of not more than 5 mol/l, preferably 2 to 4 mol/l. In some instances, these metal compounds may be added to the alumina gel suspension, so that the metal compounds in a form of an aqueous metal salt solution come in contact with alumina gel and loaded thereon.

The aqueous metal salt solution may contain appropriate additives according to demands, and it is particularly preferable to improve the dissolution stability of the metal compounds by the addition of suitable stabilizers, such as oxy acids, EDTA or ammonium salts or amine salts thereof or amino acids, whereby the loading state of the metal component can be further improved.

Agents for controlling pH, such as ammonia, may also be added to the aqueous metal salt solution to increase pH and stabilize the metal salts.

The oxy acids are hydroxycarboxylic acids (compounds having one or more carboxyl groups and one or more alcoholic hydroxy groups in molecule), and some examples include citric acid, malic acid, tartaric acid, tartronic acid, glyceric acid, hydroxybutyric acid, hydroxyacrylic acid, lactic acid and glycollic acid. Two or more of these oxy acids may be added according to demands.

EDTA is ethylenediaminetetraacetic acid. The ammonium salts of EDTA are various compounds wherein each of the 1 to 4 hydrogen atoms of the four carboxyl groups of the EDTA molecule is substituted by $NH_4$, and some examples include monoammonium ethylenediaminetetraacetate (EDTA-$NH_4$), diammonium ethylenediaminetetraacetate (EDTA-$2NH_3$), triammonium ethylenediaminetetraacetate (EDTA-$3NH_4$) and tetraammonium ethylenediaminetetraacetate (EDTA-$4NH_4$). The particularly preferred is EDTA-$2NH_4$. The examples of the amine salts of EDTA also include 1 to 4 amine salts of EDTA, and the amines forming the salts may be various organic amines. Two or more of these EDTA compounds may be added according to demands.

The amino acids are organic compounds having at least one carboxyl group and at least one amino group in molecule, and various ones may be used. The preferred examples of the amino acids are of two or more carbon atoms, particularly 3 or more carbon atoms, preferably monoaminodicarboxylic acids of 3 to 7 carbon atoms. Some examples of the amino acids include glycine, glutamic acid, aspartic acid, alanine and aminobutyric acid. Tow or more of these amino acids may be added according to demands.

The ratio of the total of the oxy acids, EDTA compounds and amino acids added to the aqueous metal salt solution is not particularly limited, and it is generally desirable to add 0.1 to 3.0 equivalent moles, preferably 0.5 to 2.8 equivalent moles of oxy acids, EDTA compounds or amino acids per mole of the Group VIA metals in the aqueous metal salt solution. If the ratio is less than the range, the aqueous metal salt solution may be insufficient in stability for attaining a good loading state of the metal component. A ratio of more than the range may cause rather difficulties, such as the deterioration of the loading state of the metal component.

That is, the addition of the oxy acids or EDTA compounds or amino acids in a proper quantity as described above improves the stability of the aqueous metal salt solution curing mixing and also improves the loading state of the metal component.

In the method of the present invention, the metal component is loaded on alumina gel by mixing the alumina gel suspension and the aqueous metal salt solution which are prepared in the manner as described above, and then evaporating the water to dry while stirring the mixture.

The method for mixing the alumina gel suspension and the aqueous metal salt solution is not particularly limited, and a method of adding the aqueous metal salt solution to the alumina gel suspension or a method contrary to this may be employed. However, it is generally preferable to introduce the alumina gel suspension and the aqueous metal salt solution in a mixture simultaneously, followed by mixing (co-pouring method). In the case of the co-pouring method, it is also desirable to introduce a proper quantity of water in the mixer prior to the simultaneous introduction of the alumina gel suspension and the aqueous metal salt solution. The desirable quantity of the water previously introduced in the mixer is 2 to 50% by volume, preferably 3 to 45% by volume, based on the total of the alumina gel suspension, the aqueous metal salt solution and the water. Although the water to be introduced previously in the mixer is preferably pure water, such as ion exchanged water or distilled water, city water or industrial water may also be used unless inhibiting the achievement of the object of the present invention.

It is desirable to maintain the alumina gel in a well dispersed (suspended) state both in the alumina gel suspension to be mixed and in the mixed solution. This may be attained easily by using a conventional high-power agitating means, such as a homogenizer or a ball mill.

The time of mixing is generally 0.1 to 24 hours, preferably about 0.2 to 5 hours.

After the alumina gel suspension and the aqueous metal salt solution were mixed as described above, the water is evaporated to dry while the mixture is stirred to load the component on the alumina gel. In the method of the present invention, it is important that the loading of the metal component is performed by the evaporation of water to dry, and with sufficient stirring. If the water is removed by liquid-solid separation, such as filtration, a part of the metal component will flow out with the separating liquid, such as filtrate, to cause difficulty in determining the quantity of the loaded metal component and in giving high loading rate. However, although complicated procedures may be required, some procedure for separating the solution, such as filtration, may be employed in the course of the evaporation so far as the loading proceeds sufficiently by the evaporation to dry. Further, if the evaporation to dry is carried out without stirring, the loading system will become uneven due to the precipitation of solids in the loading liquid, and the evaporation of water will become uneven as the drying proceeds, to make the loading state of the metal component uneven.

It is preferable to carry out the evaporation of water to dry at an increased temperature, to shorten the loading time. The desirable temperature of heating is generally 50° to 200° C., preferably 80° to 180° C. It is also preferable to increase the temperature as the evaporation to dry proceeds. The evaporation to dry may also be carried out, in vacuum, according to demands.

Thus the evaporation of water to dry is performed, to give a desired loaded product. The obtained loaded product may be molded and then calcined in some cases, to give a desired catalyst composition or a precursor thereof. The molding and calcination may be carried out by the conventional methods, and in some cases, calcination may precede molding. Anyway, a proper quantity of water may be added to the loaded product or calcined one to be molded, and according to demands, proper molding agents, such as binders, may also be added.

It is desirable to carry out the calcination generally at 400° to 600° C., preferably 420° to 580° C. The calcination is preferably carried out in the atmosphere of air or oxygen-containing gas (preferably in air flow), to oxidize the metal component and to remove the added organic components (oxy acids, EDTA compounds, amino acids, etc.) by decomposition and burning. The calcining time is generally 1 to 10 hours, preferably 2 to 8 hours.

Thus the desired catalyst composition (or a precursor thereof) is prepared.

The shape of the catalyst composition produced thus is not particularly limited, and may be used in various shapes, for example, powder, such as fine particles, granules, pellets, spherically molded particles or monoliths, depending on the purpose of use.

Prior to use in reactions, the catalyst composition may be subjected to various pretreatments for improving, controlling or recovering the catalytic functions (including activities, selectivity, life time or stability) or to treatments necessary for operation, such as calcination, activation, oxidation, reduction, presulfiding, treatment with acid gas, steaming, pre-reaction, treatment with inert gas or vacuum evacuation.

As will be described later, the catalyst composition prepared by the method of the present invention is particularly suitable for the hydrodesulfurization of various sulfur-containing hydrocarbons, such as gas oil fractions or kerosene fractions, but the use is not limitative, and for example, the catalyst composition may advantageously be used as a catalyst suitable for various reactions requiring hydrogenation function, particularly for the hydrodenitrogenation of nitrogen-containing hydrocarbons, the hydrogenation of various aromatic hydrocarbons, such as the hydrogenation of dimethylnaphthalene, and further for the hydrogenation of other hydrocarbons.

Hereinafter is described the hydrodesulfurization process of the present invention, which is a particularly desirable application of the catalyst composition prepared by the method of the present invention.

The hydrodesulfurization process of the present invention is characterized in allowing a sulfur-containing hydrocarbon in the presence of hydrogen to contact the catalyst composition prepared by the method of the present invention. That is, as far as at least the catalyst composition (generally the one containing as active metals at least molybdenum and/or tungsten and cobalt and/or nickel) is used, the hydrodesulfurization process of the present invention may be carried out in the same manner as in the conventional hydrodesulfurization processes. Hereinafter are described the preferable material hydrocarbon fractions (sulfur-containing hydrocarbon fractions) and reaction conditions.

In the hydrodesulfurization process of the present invention, the sulfur-containing hydrocarbons which may be used generally as the feed oils to be subjected to hydrodesulfurization are hydrocarbons containing sulfur-containing hydrocarbon molecules, particularly various hydrocarbons or hydrocarbon fractions having boiling points of 50° to 525° C., and some examples of such feed oils include naphtha, kerosene, gas oil, atmospheric residue, vacuum residue, vacuum gas oil, crude oil, light cycle oil, oil shale oil and coal liquefied oil. Among these, the particularly preferred are kerosene fractions having a boiling point of 150° to 350° C., gas oil fractions, kerosene-gas oil fractions and atmospheric residue. These may be used as a mixture of two or more in some cases.

The desirable sulfur content in the feed oil is 0.01 to 5.0% by weight, preferably 0.03 to 1.5% by weight.

The catalyst composition of the present invention is used as the catalyst for the hydrodesulfurization. As described previously, it is generally desirable to use a calcined one, preferably one subjected to pretreatment, such as presulfiding, after the calcination.

The desirable reaction temperature is generally 150° to 430° C., preferably 180° to 410° C.

The desirable reaction pressure is generally 10 to 150 kg/cm$^2$, preferably 15 to 140 kg/cm$^2$.

The desirable ratio of the hydrogen to the feed oil (H$_2$/oil ratio) is generally 10 to 5000 Nl/kl, preferably 20 to 4000 Nl/kl.

The desulfurization process may be carried out by various reaction systems, and it is generally preferable to employ a continuous flow system. In such a case, the desirable LHSV, which is determined from the feeding speed of the feed oil and the quantity of the catalyst, is generally 0.1 to 30 h$^{-1}$, preferably 0.2 to 28 hr$^{-1}$.

By using the catalyst composition prepared by the method of the present invention (particularly those containing as the active metals at least molybdenum and/or tungsten and cobalt and/or nickel) as the hydrodesulfurization catalyst, the sulfur contained in the sulfur-containing feed oil can be efficiently and sufficiently removed in the form of H$_2$S, and the desired hydrocarbon fractions with extremely decreased sulfur content can be obtained easily.

The after treatments of the reaction product, such as separation, recovery and refining, may be carried out easily according to the conventional methods. The recovered unreacted hydrogen or a part of the product oil may be recycled, if necessary. When the catalytic activities are decreased under the predetermined level, regeneration may optionally be carried out to use the catalyst composition repeatedly. The regeneration of the catalyst may be performed easily by the conventional methods.

Hereinafter, the present invention will be described in detail referring to Examples and Comparative Examples, which are not to be construed to limit the present invention.
(a) Preparation example of alumina gel
(Preparation of alumina gel A)

64 g of sodium aluminate was dissolved in 800 cc of pure water, and the aqueous solution was heated to 60° C. (liquid A). 850 g of aluminum sulfate (14–18 hydrate) was dissolved in 4700 g of pure water, and the aqueous solution was heated to 60° C. (liquid B). While the liquid A was stirred, the liquid B was added thereto, and precipitation occurred at pH 7. Thereafter, the precipitate was immediately separated and recovered by filtration, and was then introduced in a 0.2% by weight aqueous ammonia maintained at 50° C. and was washed by stirring. The washed precipitate was separated and recovered by filtration, to obtain the objective alumina gel (hereinafter, referred to as alumina gel A).

The alumina gel A contained 18.2% by weight of alumina.
(Preparation of alumina gel B)

64 g of sodium aluminate was dissolved in 800 cc of pure water, and the aqueous solution was heated to 60° C. (liquid A). 850 g of aluminum sulfate (14–18 hydrate) was dissolved in 4700 g of pure water, and the aqueous solution was heated to 60° C. (liquid B). While the liquid A was stirred, the liquid B was added thereto, and precipitate occurred at pH 7. Thereafter, the precipitate was immediately separated and recovered by filtration, and was then introduced in a 0.2% by weight aqueous ammonia maintained at 50° % and was washed by stirring. The washed precipitate was separated and recovered by filtration, to obtain an alumina gel.

The obtained alumina gel was dispersed again in pure water, and after pH was adjusted to 10 with aqueous ammonia, the dispersion was aged at 95° C. for about 24 hours with stirring. Thereafter, dehydration was carried out by filtration, to obtain the objective alumina gel (hereinafter, referred to as alumina gel B). The alumina gel B contained 32.0% by weight of alumina.

(b) Preparation example of an aqueous metal salt solution (1) 390 g of ammonium paramolybdate, 330 g of cobalt nitrate, 450 g of EDTA.2NH$_4$ and 350 g of 28% by weight aqueous ammonia were dissolved in distilled water, to prepare 1.5 l of an aqueous metal salt solution A.

(2) 390 g of ammonium paramolybdate, 330 g of cobalt nitrate and 230 g of citric acid were dissolved in distilled water, to prepare 1.0 l of an aqueous metal salt solution B.

(3) 390 g of ammonium paramolybdate, 330 g of cobalt nitrate, 450 g of glutamic acid and 350 g of 28% by weight aqueous ammonia were dissolved in distilled water, to prepare 1.5 l of an aqueous metal salt solution C.

(4) 91.8 g of nickel nitrate was dissolved in 1500 cc of distilled water, to prepare an aqueous metal salt solution D. 136.2 g of ammonium molybdate and 21 cc of 30% by weight aqueous hydrogen peroxide solution were dissolved in 1500 cc of distilled water, to prepare an aqueous metal salt solution E.

(5) 370 g of MoO$_3$, 190 g of basic cobalt carbonate, 450 g of EDTA-2NH$_4$ and 350 g of 28% by weight aqueous ammonia were dissolved in distilled water, to prepare 1.5 l of an aqueous metal salt solution F.

(6) 370 g of MoO$_3$, 190 g of basic cobalt carbonate and 230 g of malic acid were dissolved in distilled water, to prepare 1.0 l of an aqueous metal salt solution G.

(7) 370 g of MoO$_3$, 190 g of basic cobalt carbonate, 450 g of glutamic acid and 350 g of 28% by weight aqueous ammonia were dissolved in distilled water, to prepare 1.5 l of an aqueous metal salt solution H.

EXAMPLE 1

1648 g of the alumina gel A (Al$_2$O$_3$ conversion: 300 g) prepared in (a) was introduced in 1352 cc of pure water (distilled water) and was dispersed sufficiently with a homogenizer, to prepare an alumina gel suspension with an alumina content of about 10% by weight. 200 cc of pure water was introduced and stirred in a 10-liter vessel, into which the alumina gel suspension and 540 cc of the aqueous metal salt solution prepared in (b) were added simultaneously. After the addition, the mixture was heated and stirred at 100° C. to evaporate water to dry, to give a loaded product containing no excessive water. The loaded product with a proper water content was extruded into cylindrical particles, which were dried at 120° C. for 5 hours and then calcined in air flow at 550° C. for three hours, to give a desired catalyst composition A.

Hydrodesulfurization of sulfur-containing hydrocarbons was carried out in the following manner by using the catalyst composition A, to evaluate the catalytic activities.

That is, hydrodesulfurization was carried out by using as a feed oil a Middle Eastern gas oil (LGO) with 1.18% by weight of sulfur content.

The reaction tube of a high pressure fixed bed flow reactor was filled with 100 cc of the catalyst composition, which, for the purpose of pretreatment, was then presulfided by flowing the feed oil (LGO) at 250° C. at 30 kg/cm$^2$ for 24 hours, to give a catalyst.

Thereafter, the feed oil was fed together with hydrogen to the presulfided catalyst layer at reaction temperatures of 310° to 350° C. (the temperature was raised in the steps, 310, 330 and 350° C.), at a pressure of 30 kg/cm$^2$, at a hydrogen/feed oil ratio of 200 Nl/kl and at an LHSV of 4.0 hr$^{-1}$, so that the feed oil was refined by hydrodesulfurization.

At the time, the sulfur content in the refined oil was measured with a sulfur meter, and from the sulfur content $S_2$ in the refined oil and the sulfur content $S_2$ in the feed oil, the desulfurization rate $[(S_2-S_2)/S_2]\times 100$ was calculated, which will be called herein the desulfurization activity of the catalyst. The desulfurization activity of the catalyst (LGO desulfurization activity) at each reaction temperature is shown in Table 1.

EXAMPLE 2

1648 g of the alumina gel A (Al$_2$O$_3$ conversion: 300 g) prepared in (a) was introduced in 1352 cc of pure water (distilled water) and was dispersed sufficiently with a homogenizer, to prepare an alumina gel suspension with an alumina content of about 10% by weight. 200 cc of pure water was introduced and stirred in a 10-liter vessel, into which the alumina gel suspension and 360 cc of the aqueous metal salt solution B prepared in (b) were added simultaneously. After the addition, the mixture was heated and stirred at 100° C. to evaporate water to dry, to give a loaded product containing no excessive water. The loaded product with a proper water content was extruded into cylindrical particles, which were dried at 120° C. for 5 hours and then calcined in air flow at 550° C. for three hours, to give a desired catalyst composition B.

The catalyst composition B was then subjected to presulfiding and was used for desulfurization reaction in the same manner as in Example 1, to evaluate the desulfurization activity. The results are shown in Table 1.

EXAMPLE 3

1648 g of the alumina gel A (Al$_2$O$_3$ a conversion: 300 g) prepared in (a) was introduced in 1352 cc of pure water (distilled water) and was dispersed sufficiently with a homogenizer, to prepare an alumina gel suspension with an alumina content of about 10% by weight. 200 cc of pure water was introduced and stirred in a 10-liter vessel, into which the alumina gel suspension and 540 cc of the aqueous metal salt solution C prepared in (b) were added simultaneously. After the addition, the mixture was heated and stirred at 100° C. to evaporate water to dry, to give a loaded product containing no excessive water. The loaded product with a proper water content was extruded into cylindrical particles, which were dried at 120° C. for 5 hours and then calcined in air flow at 550° C. for three hours, to give a desired catalyst composition C.

The catalyst composition C was then subjected to presulfiding and was used for desulfurization reaction in the same manner as in Example 1, to evaluate the desulfurization activity. The results are shown in Table 1.

EXAMPLE 4

1648 g of the alumina gel A (Al$_2$O$_3$ conversion: 300 g) prepared in (a) was introduced in 1352 cc of pure water (distilled water) and was dispersed sufficiently with a homogenizer, to prepare an alumina gel suspension with an alumina content of about 10% by weight. 200 cc of pure water was introduced and stirred in a 10-liter vessel, into which the alumina gel suspension and 540 cc of the aqueous metal salt solution F prepared in (b) were added simultaneously. After the addition, the mixture was heated and stirred at 100° C. to evaporate water to dry, to give a loaded product containing no excessive water. The loaded product with a proper Water content was extruded into cylindrical particles, which were dried at 120° C. for 5 hours and then calcined in air flow at 550° C. for three hours, to give a desired catalyst composition D.

The catalyst:composition D was then subjected to presulfiding and was used for desulfurization reaction in the same manner as in Example 1, to evaluate the desulfurization activity. The results are shown in Table 1.

EXAMPLE 5

1648 g of the alumina gel A ($Al_2O_3$ conversion: 300 g) prepared in (a) was introduced in 1352 cc of pure water (distilled water) and was dispersed sufficiently with a homogenizer, to prepare an alumina gel suspension with an alumina content of about 10% by weight. 200 cc of pure water was introduced and stirred in a 10-liter vessel, into which the alumina gel suspension and 540 cc of the aqueous metal salt solution G prepared in (b) were added simultaneously. After the addition, the mixture was heated and stirred at 100° C. to evaporate water to dry, to give a loaded product containing no excessive water. The loaded product with a proper water content was extruded into cylindrical particles, which were dried at 120° C. for 5 hours and then calcined in air flow at 550° C. for three hours, to give a desired catalyst composition E.

The catalyst composition E was then subjected to presulfiding and was used for desulfurization reaction in the same manner as in Example 1, to evaluate the desulfurization activity. The results are shown in Table 1.

EXAMPLE 6

1648 g of the alumina gel A ($Al_2O_3$ conversion: 300 g) prepared in (a) was introduced in 1352 cc of pure water (distilled water) and was dispersed sufficiently with a homogenizer, to prepare an alumina gel suspension with an alumina content of about 10% by weight. 200 cc of pure water was introduced and stirred in a 10-liter vessel, into which the alumina gel suspension and 540 cc of the aqueous metal salt solution H prepared in (b) were added simultaneously. After the addition, the mixture was heated and stirred at 100° C. to evaporate water to dry, to give a loaded product containing no excessive water. The loaded product with a proper water content was extruded into cylindrical particles, which were dried at 120° C. for 5 hours and then calcined in air flow at 550° C. for three hours, to give a desired catalyst composition F.

The catalyst composition F was then subjected to presulfiding and was used for desulfurization reaction in the same manner as in Example 1, to evaluate the desulfurization activity. The results are shown in Table 1.

COMPARATIVE EXAMPLE 1

To 1648 g of the alumina gel A ($Al_2O_3$ conversion: 300 g) prepared in (a) was added 540 cc of the aqueous metal salt solution A prepared in (b). After the addition, the mixture was heated and stirred at 100° C. to evaporate water to dry, to give a loaded product containing no excessive water. The loaded product with a proper water content was extruded into cylindrical particles, which were dried at 120° C. for 5 hours and then calcined in air flow at 550° C. for three hours, to give a catalyst composition I for comparison.

The catalyst composition I was then subjected to presulfiding and was used for desulfurization reaction in the same manner as in Example 1, to evaluate the desulfurization activity. The results are shown in Table 1.

COMPARATIVE EXAMPLE 2

1648 g of the alumina gel A ($Al_2O_3$ conversion: 300 g) prepared in (a) was introduced in 640 cc of pure water (distilled water) and was dispersed sufficiently with a homogenizer, to prepare an alumina gel suspension with an alumina content of about 13.2% by weight. 200 cc of pure water was introduced and stirred in a 10-liter vessel, into which the alumina gel suspension and 540 cc of the aqueous metal salt solution A prepared in (b) were added simultaneously. After the addition, the mixture was heated and stirred at 100° C. to evaporate water to dry, to give a loaded product containing no excessive water. The loaded product with a proper water content was extruded into cylindrical particles, which were dried at 120° C. for 5 hours and then calcined in air flow at 550° C. for three hours, to give a catalyst composition II for comparison.

The catalyst composition II was then subjected to presulfiding and was used for desulfurization reaction in the same manner as in Example 1, to evaluate the desulfurization activity. The results are shown in Table 1.

COMPARATIVE EXAMPLE 3

To 1648 g of the alumina gel A ($Al_2O_3$ conversion: 300 g) prepared in (a) were added 1500 cc of the aqueous metal salt solution E and 1500 cc of the aqueous metal salt solution D prepared in (b), and the alumina gel was dispersed again. After the dispersion was stirred for two hours to allow the aqueous metal salt solutions to react with alumina sufficiently, the excessive water was removed by filtration, and the resulting mixture was washed with 3 l of pure water, to give a loaded product. After the water content was adjusted to suit extrusion, the loaded product was extruded into cylindrical particles, which were dried at 120° C. for 5 hours and then calcined in air flow at 550° C. for three hours, to give a catalyst composition III for comparison.

The catalyst composition III was then subjected to presulfiding and was used for desulfurization reaction in the same manner as in Example 1, to evaluate the desulfurization activity. The results are shown in Table 1.

COMPARATIVE EXAMPLE 4

To 1648 g of the alumina gel A ($Al_2O_3$ conversion: 300 g) prepared in (a) was added 360 cc of the aqueous metal salt solution G prepared in (b). After the addition, the mixture was heated and stirred at 100° C. to evaporate water to dry, to give a loaded product containing no excessive water. The loaded product with a proper water content was extruded into cylindrical particles, which were dried at 120° C. for 5 hours and then calcined in air flow at 550° C. for three hours, to give a catalyst composition IV for comparison.

The catalyst composition IV was then subjected to presulfiding and was used for desulfurization reaction in the same manner as in Example 1, to evaluate the desulfurization activity. The results are shown in Table 1.

COMPARATIVE EXAMPLE 5

1648 g of the alumina gel A (Al$_2$O$_3$ conversion: 300 g) prepared in (a) was introduced in 640 cc of pure water (distilled water) and was dispersed sufficiently with a homogenizer, to prepare an alumina gel suspension with an alumina content of about 13.2% by weight. 200 cc of pure water was introduced and stirred in a 10-liter vessel, into which the alumina gel suspension and 540 cc of the aqueous metal salt solution F prepared in (b) were added simultaneously. After the addition, the mixture was heated and stirred at 100° C. to evaporate water to dry, to give a loaded product containing no excessive water. The loaded product with a proper water content was extruded into cylindrical particles, which were dried at 120° C. for 5 hours and then calcined In air flow at 550° C. for three hours, to give a catalyst composition V for comparison.

The catalyst composition V was then subjected to presulfiding and was used for desulfurization reaction in the same manner as in Example 1, to evaluate the desulfurization activity. The results are shown in Table 1.

TABLE 1

|  | Example No. |  |  |  |  |  | Comparative example No. |  |  |  |  |
|---|---|---|---|---|---|---|---|---|---|---|---|
|  | 1 | 2 | 3 | 4 | 5 | 6 | 1 | 2 | 3 | 4 | 5 |
| LGO desulfurization activity (wt %) |  |  |  |  |  |  |  |  |  |  |  |
| 310° C. | 80 | 81 | 82 | 81 | 80 | 82 | 77 | 78 | 60 | 78 | 78 |
| 330° C. | 92 | 91 | 93 | 92 | 92 | 93 | 89 | 89 | 77 | 90 | 90 |
| 350° C. | 97 | 98 | 98 | 98 | 98 | 88 | 94 | 95 | 87 | 95 | 95 |

EXAMPLE 7

938 g of the alumina gel B (Al$_2$O$_3$ conversion: 300 g) prepared in (a) was introduced in 2063 cc of pure water (distilled water) and was dispersed sufficiently with a homogenizer, to prepare an alumina gel suspension with an alumina content of about 10% by weight. 200 cc of pure water was introduced and stirred in a 10-liter vessel, into which the alumina gel suspension and 540 cc of the aqueous metal salt solution A prepared in (b) were added simultaneously. After the addition, the mixture was heated and stirred at 100° C. to evaporate water to dry, to give a loaded product containing no excessive water. The loaded product with a proper water content was extruded into cylindrical particles, which were dried at 120° C. for 5 hours and then calcined in air flow at 550° C. for three hours, to give a desired catalyst composition G.

Hydrodesulfurization of sulfur-containing hydrocarbons was carried out in the following manner by using the catalyst composition G, to evaluate the catalytic activities.

That is, hydrodesulfurization was carried out by using as a feed oil a Middle Eastern atmospheric residue with 4.1% by weight of sulfur content.

The reaction tube of a high pressure fixed bed flow reactor was filled with 100 cc of the catalyst composition, which, for the purpose of pretreatment, was then presulfided by flowing the feed oil at 250° C. at 135 kg/cm$^2$ for 24 hours, to give a catalyst.

Thereafter, the feed oil was fed together with hydrogen to the presulfided catalyst layer at reaction temperatures of 390° to 410° C. (the reaction temperature was raised in the steps. 390° C., 400° C. and 410° C.), at a pressure of 135 kg/cm$^2$, at a hydrogen/feed oil ratio of 1000 Nl/kl and at an LHSV of 0.3 hr$^{-1}$, so that the feed oil was refined by hydrodesulfurization.

At the time, the sulfur content in the refined oil was measured with a sulfur meter, and from the sulfur content $S_2$ in the refined oil and the sulfur content $S_2$ in the feed oil, the desulfurization rate $[(S_1-S_2)/S_2]\times100$ was calculated, which will be called herein the desulfurization activity of the catalyst. The desulfurization activity of the catalyst (LGO desulfurization activity) at each reaction temperature is shown in Table 2.

COMPARATIVE EXAMPLE 6

To 938 g of the alumina gel B (Al$_2$O$_3$ conversion: 300 g) prepared in (a) was added 540 cc of the aqueous metal salt solution A prepared in (b). After the addition, the mixture was heated and stirred at 100° C. to evaporate water to dry, to give a loaded product containing no excessive water. The loaded product with a proper water content was extruded into cylindrical particles, which were dried at 120° C. for 5 hours and then calcined in air flow at 550° C. for three hours, to give a catalyst composition VI for comparison.

The catalyst composition VI was then subjected to presulfiding and was used for desulfurization reaction in the same manner as in Example 7, to evaluate the desulfurization activity. The results are shown in Table 2.

TABLE 2

|  | Example 7 | Comparative example 6 |
|---|---|---|
| Heavy oil desulfurization activity (wt %) |  |  |
| 390° C. | 91 | 89 |
| 400° C. | 94 | 92 |
| 310° C. | 96 | 95 |

INDUSTRIAL APPLICABILITY

The method of the present invention for preparing catalyst compositions permits effective loading of Group VIA metals and Group VIII metals to a sufficiently high loading rate (particularly, lessens the useless aggregation of the metal component to allow to exhibit high desulfurization activities) by using simple operation, thereby giving easily very active catalyst compositions which can be used as catalysts being superior in functions, such as activities, (particularly, being very effective for the hydrodesulfurization of sulfur-containing hydrocarbons) to the conventional hydrogenation catalysts, such as hydrodesulfurization catalysts prepared by the conventional loading techniques, such as the above-described impregnation or kneading techniques.

The hydrodesulfurization process of the present invention uses as hydrodesulfurization catalysts the catalyst compositions prepared by the method of the present invention and having excellent catalytic properties and functions, thereby enabling efficient production of well desulfurized and refined hydrocarbons from various sulfur-containing hydrocarbons, for example, hydrocarbon fractions containing sulfur-containing hydrocarbon molecules, such as kerosene-gas oil fractions.

We claim:

1. A method of preparing a catalyst composition, comprising mixing an alumina gel suspension which is prepared by dispersing alumina gel in pure water in an alumina concentration of 0.1 to 12% by weight, with an aqueous metal salt solution wherein a compound of a Group VIA metal of the Periodic Table and a compound of a Group VIII metal of the Periodic Table are dissolved, and then evaporating the water to effect drying while the mixture is stirred, to load the metal compounds on the alumina gel.

2. The method of preparing the catalyst composition as claimed in claim 1, wherein the alumina gel suspension contains the alumina gel in an alumina concentration of 5 to 10% by weight.

3. The method of preparing the catalyst composition as claimed in claim 1, wherein the total of the compound of the Group VIA metal and the compound of the Group VIII metal is 20 to 70% by weight based on the total of the compound of the Group VIA metal, the compound of the Group VIII metal and the alumina gel, with the proviso that the compound of the Group VIA metal and the compound of the Group VIII metal are calculated as stable oxides of the metals and the alumina gel is calculated as $Al_2O_3$, and the aqueous metal salt solution contains the compound of the Group VIA metal and the compound of the Group VIII metal in total in a metal molar concentration of 2 to 4 mol/l.

4. The method of preparing the catalyst composition as claimed in claim 3, wherein the Group VIA metal is molybdenum or tungsten, the Group VIII metal is cobalt or nickel, and the compound of the Group VIA metal is 10 to 60% by weight, and the compound of the Group VIII metal is 2 to 30% by weight, both based on the total of the compound of the Group VIA metal, the compound of the Group VIII metal and the alumina gel, with the proviso that the compound of the Group VIA metal and the compound of the Group VIII metal are calculated as stable oxides of the metals and the alumina gel is calculated as $Al_2O_3$.

5. The method of preparing the catalyst composition as claimed in claim 4, wherein the compound of the Group VIA metal is selected from the group consisting of ammonium molybdate, ammonium paramolybdate, ammonium metamolybdate, molybdic acid, paramolybdic acid, metamolybdic acid, $MoO_3$, ammonium tungstate, ammonium paratungstate, ammonium metatungstate, tungstic acid, paratungstic acid, metatungstic acid, $WO_3$ and a mixture thereof, and the compound of the Group VIII metal is selected from the group consisting of cobalt nitrate, cobalt acetate, basic cobalt carbonate, nickel nitrate, nickel acetate, basic nickel carbonate and a mixture thereof.

6. The method of preparing the catalyst composition as claimed in claim 1, wherein the alumina gel suspension is mixed with the aqueous metal salt solution by adding the alumina gel suspension and the aqueous metal salt solution to pure water simultaneously.

7. The method of preparing the catalyst composition as claimed in claim 6, wherein the total of the compound of the Group VIA metal and the compound of the Group VIII metal is 20 to 70% by weight based on the total of the compound of the Group VIA metal, the compound of the Group VIII metal and the alumina gel, with the proviso that the compound of the Group VIA metal and the compound of the Group VIII metal are calculated as stable oxides of the metals and the alumina gel is calculated as $Al_2O_3$, the aqueous metal salt solution contains the compound of the Group VIA metal and the compound of the Group VIII metal in total in a metal molar concentration of 2 to 4 mol/l, and the pure water to which the alumina gel suspension and the aqueous metal salt solution are added is 2 to 50% by volume of the total of the alumina gel suspension, the aqueous metal salt solution and the pure water.

8. The method of preparing the catalyst composition as claimed in claim 1, wherein the aqueous metal salt solution is stabilized with EDTA, an ammonium salt of EDTA or an amine salt of EDTA.

9. The method of preparing the catalyst composition as claimed in claim 8, wherein 0.1 to 3.0 equivalent moles of EDTA, ammonium salt of EDTA or amine salt of EDTA is used per mole of the compound of the Group VIA metal.

10. The method of preparing the catalyst composition as claimed in claim 9, wherein the compound of the Group VIA metal is ammonium paramolybdate or $MoO_3$, the compound of the Group VIII metal is cobalt nitrate or basic cobalt carbonate, the total of the compound of the Group VIA metal and the compound of the Group VIII metal is 20 to 70% by weight based on the total of the compound of the Group VIA metal, the compound of the Group VIII metal and the alumina gel, with a weight ratio of the compound of the Group VIII metal/the compound of the Group VIA metal of 0.10 to 0.50, with the proviso that the compound of the Group VIA metal and the compound of the Group VIII metal are calculated as stable oxides of the metals and the alumina gel is calculated as $Al_2O_3$, the aqueous metal salt solution contains the compound of the Group VIA metal and the compound of the Group VIII metal in total in a metal molar concentration of 2 to 4 mol/l, the aqueous metal salt solution is stabilized with $EDTA.2NH_4$, the alumina gel suspension is mixed with the aqueous metal salt solution by adding the alumina gel suspension and the aqueous metal salt solution to pure water simultaneously, and the pure water to which the alumina gel suspension and the aqueous metal salt solution are added is 2 to 50% by volume of the total of the alumina gel suspension, the aqueous metal salt solution and the pure water.

11. The method of preparing the catalyst composition as claimed in claim 1, wherein the aqueous metal salt solution is stabilized with an oxy acid.

12. The method of preparing the catalyst composition as claimed in claim 11, wherein 0.1 to 3.0 equivalent moles of the oxy acid is used per mole of the metal of the compound of the Group VIA metal.

13. The method of preparing the catalyst composition as claimed in claim 12, wherein the oxy acid is selected from the group consisting of citric acid, malic acid, tartaric acid, tartronic acid, glyceric acid, hydroxybutyric acid, hydroxyacrylic acid, lactic acid, glycollic acid and a mixture thereof.

14. The method of preparing the catalyst composition as claimed in claim 13, wherein the compound of the Group VIA metal is ammonium paramolybdate or $MoO_3$, the compound of the Group VIII metal is cobalt nitrate or basic cobalt carbonate, the total of the compound of the Group VIA metal and the compound of the Group VIII metal is 20 to 70% by weight based on the total of the compound of the Group VIA metal, the compound of the Group VIII metal and the alumina gel, with a weight ratio of the compound of the Group VIII metal/the compound of the Group VIA metal of 0.10 to 0.50, with the proviso that the compound of the Group VIA metal and the compound of the Group VIII metal are calculated as stable oxides of the metals and the alumina gel is calculated as $Al_2O_3$, the aqueous metal salt solution contains the compound of the Group VIA metal and the compound of the Group VIII metal in total in a metal molar concentration of 2 to 4 mol/l, the aqueous metal salt solution is stabilized with citric acid or malic acid, alumina gel suspension is mixed with the aqueous metal salt solution by adding the alumina gel suspension and the aqueous metal salt solution to pure water simultaneously, and the pure water to which the alumina gel suspension and the aqueous metal salt solution are added is 2 to 50% by volume of the total of the alumina gel suspension, the aqueous metal salt solution and the pure water.

15. The method of preparing the catalyst composition as claimed in claim 1, wherein the aqueous metal salt solution is stabilized with an amino acid.

16. The method of preparing the catalyst composition as claimed in claim 15, wherein 0.1 to 3.0 equivalent moles of the amino acid is used per mole of the metal of the compound of the Group VIA metal.

17. The method of preparing the catalyst composition as claimed in claim 16, wherein the amino acid is selected from the group consisting of glycine, glutamic acid, aspartic acid, alanine, aminobutyric acid and a mixture thereof.

18. The method of preparing the catalyst composition as claimed in claim 17, wherein the compound of the Group VIA metal is ammonium paramolybdate or $MoO_3$, the compound of the Group VIII metal is cobalt nitrate or basic cobalt carbonate, the total of the compound of the Group VIA metal and the compound of the Group VIII metal is 20 to 70% by weight based on the total of the compound of the Group VIA metal, the compound of the Group VIII metal and the alumina gel, with a weight ratio of the compound of the Group VIII metal/the compound of the Group VIA metal of 0.10 to 0.50, with the proviso that the compound of the Group VIA metal and the compound of the Group VIII metal are calculated as stable oxides of the metals and the alumina gel is calculated as $Al_2O_3$, the aqueous metal salt solution contains the compound of the Group VIA metal and the compound of the Group VIII metal in total in a metal molar concentration of 2 to 4 mol/l, the aqueous metal salt solution is stabilized with glutamic acid, the alumina gel suspension is mixed with the aqueous metal salt solution by adding the alumina gel suspension and the aqueous metal salt solution to pure water simultaneously, and the pure water to which the alumina gel suspension and the aqueous metal salt solution are added is 2 to 50% by volume of the total of the alumina gel suspension, the aqueous metal salt solution and the pure water.

19. A process of hydrodesulfurizing a sulfur-containing hydrocarbon, comprising allowing the sulfur-containing hydrocarbon to contact the catalyst composition prepared by the method claimed in claim 1 in the presence of hydrogen, at a temperature of 150° to 430° C. and at a reaction pressure of 10 to 150 kg/cm².

\* \* \* \* \*